T. S. MINNISS.

Seed-Planter.

No. 12,958.   Patented May 29. 1855.

UNITED STATES PATENT OFFICE.

THOMAS S. MINNISS, OF MEADVILLE, PENNSYLVANIA.

IMPROVEMENT IN SEED-PLANTERS.

Specification forming part of Letters Patent No. 12,958, dated May 29, 1855.

*To all whom it may concern:*

Be it known that I, THOMAS S. MINNISS, of Meadville, in the county of Crawford, in the State of Pennsylvania, have invented a new and useful Seed-Planter and Distributer of Fertilizers; and I do hereby declare that the following is a full, clear, and exact description of the construction and operation of the same, reference being had to the annexed drawings, making a part of this specification, in which—

Figure 1:
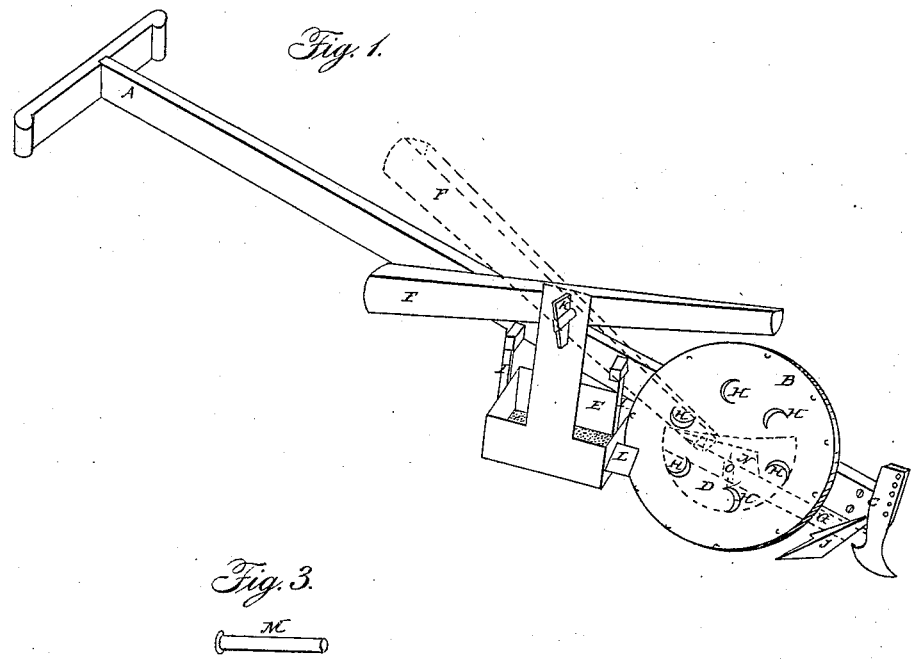
Figure 3:
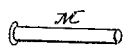
Figure 2:
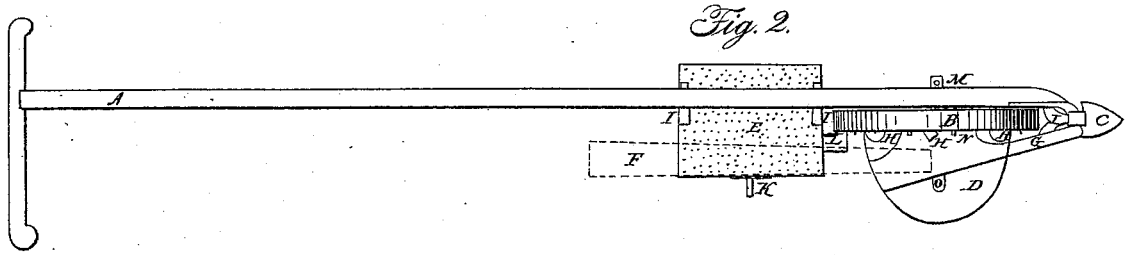

Figure 1 is a perspective view. Fig. 2 is a ground view, and Fig. 3 is a perspective view of the hollow axle for the wheel to revolve upon.

The aim of this my invention is to furnish a machine that shall do no injury to the seed in its distribution; that shall be so simple and cheap of construction, and so light that it shall be within the means of all, and can be used by a person without that strain upon the arms caused by propelling a barrow at arms length; and also to scatter ashes or other light fertilizers over the planted row, and plant pumpkin or other seeds with corn, &c., at any desired interval.

To enable others skilled in the art to make and use my invention, I will proceed to describe its construction and operation.

I take a piece of plank, one and a half inch thick, about seven feet long, three and a half inches wide at one end, and tapered to two inches at the other end, for the beam. (See A.) (The letters in each figure refer to like parts.) I then take another piece of plank of the thickness and width of the narrow end of the beam, and two feet long, and mortise it across the end, so that its center shall be on a line with the wheel B and the tooth C. (See Fig. 2.) I make my wheel of one and a half inch plank, about fourteen inches in diameter, and it revolves on a tubular axle which passes through the beam about ten or twelve inches from the broadest end. I then secure the tooth C to the broad end of the beam by screws or rivets. (See Fig. 1.) Fig. 2 shows how the shank of the tooth is let into the side of the beam, so that the wheel may work close to the beam. The lower end of C is made somewhat resembling a horse's hoof—hollow for three or four inches. Five inches from the lower point of the tooth I drill an oblique hole about one and a half inch in diameter and cut a coarse thread therein. Into this I screw the forked paddle J, which covers the seed after being dropped by the tube G within the opening in C. This paddle or coverer also answers the additional purpose of a gage to regulate the depth of the seeding-tooth, as it can be set by the screw in or out. There are two shanks to the seeding-tooth C—one on the side, bent far enough off from the beam to make the furrow on a line with the track of the wheel, and the other upright for six or eight inches above the shovel, with a series of holes through it to furnish an attachment for a horse, if desired. About four inches from the center of the wheel B, I strike a circle, and around this circle, at any required distance, I bore oblique holes—say half-inch holes. I then take the half of a tube, divided longitudinally, that would fill the holes, and with plugs cut off at proper angles to be level with the face of the wheel I secure these half-tubes at any projection desired. These are the dippers or elevators H H H H, that dip the seeds from the hoppers D and discharge them into the tube G, a portion of which, inside the hopper, is spread out and flares against the side of the wheel to receive them, (see N.)

When seed is to be planted in hills I drive in all the elevators but one, and draw that one out far enough to contain a sufficient quantity for a hill, one revolution of the wheel—three feet eight inches—being about the proper distance; or, if the wheel is twenty-eight inches in diameter, then two elevators will be left, or three may project, which will be about twenty-six inches apart; or they may be so close as to drop every two inches, if necessary, and the elevators driven in so as to take up but a single grain in each.

The hopper consists of a piece of sheet metal cut and bent so as to form something like one-quarter of a hollow sphere whose diameter shall correspond to the dotted lines D, Fig. 1, which surround H H H. This, placed against the side of the wheel, forms the hopper. The cup or dipper-looking part of the hopper may vary in flare and capacity, provided that part which touches the face of the wheel shall have a circular edge to correspond with the sweep of the outer sides of the elevators, which should dip to the bottom to take up the last grain. The hopper is fixed to the side of the wheel by a rod, O, which passes through the hollow axle M, Fig. 2, and secured by a pin through both, as at M, Fig. 2, and by another pin, through O, on the outside of the hopper. This, with the tube G, that passes obliquely through its side (see Fig. 1, G) till it enters the side of C, Fig. 2, which is slightly bent to hold it against J, prevents it (the hopper) from revolving with the wheel. The hollow axle is made of sheet metal formed into a tube long enough to reach through the wheel and beam, and large enough to fill the hole in each, with a slight flange turned up at one end, which flange answers the purpose of a nut or pin, (see M, Fig. 3.)

On two pins projecting from the side of the beam I hang the sifting-box E by the straps I I, low enough to swing clear of the under side of the beam, but so as to be central with the wheel and furrow, the bottom of the box being made of perforated sheet metal or a coarse sieve. To the side next the wheel is a projection from the box (see L) that rubs against the side of the wheel, and around this part of the wheel, near the edge, I drive in short staples, so as to shake the box when they pass under L, which is at an angle to pass easily over, but sharp in the other direction, so as to lock the moment it is attempted to be drawn backward. Thus nothing can be deposited when the machine goes backward, which will be convenient when turning at the ends of rows. This contrivance also shakes off all grains that may be heaped upon the elevators before they reach their point of discharge, and thus secure a more equable quantity in each.

To the right side of the sifter-box, sufficiently high to be above the top of the wheel, I erect a standard, and to the side of this, near the top, I secure a long light spout or trough, F, by a key, K, through a loop in the side of F. This spout will have its discharge end directly over the seeding-tube, and can be set at any inclination desired, so as to discharge fast or slow, or be thrown up and stop entirely. This is for pumpkin or other seed, and light fertilizers that are to be buried with the discharges from the hopper.

When operating the machine the cross-bar or handle will come so high as to bear against the body and take the strain from the arms in its propulsion.

What I claim as my invention, and desire to secure by Letters Patent, is—

The wheel B, with the sliding or expanding elevators H H H through its side, in combination with the sifting-box E and the spout F, constructed and arranged substantially in the manner and for the purposes set forth.

THOS. S. MINNISS.

Witnesses:
 M. H. BAGLEY,
 COOPER RAY.